(12) United States Patent
Chikkappa et al.

(10) Patent No.: US 9,565,622 B2
(45) Date of Patent: Feb. 7, 2017

(54) DETECTING SERVICES PROVIDED BY A WIRELESS NODE BEFORE DEVICE DISCOVERY AND CONNECTION ESTABLISHMENT

(75) Inventors: Kiran S. Chikkappa, Bangalore (IN); Patrik N. Lundqvist, San Diego, CA (US); Gang Ding, San Diego, CA (US); Padmapriya Jagannathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 13/542,217

(22) Filed: Jul. 5, 2012

(65) Prior Publication Data
US 2014/0010107 A1    Jan. 9, 2014

(51) Int. Cl.
| | |
|---|---|
| *H04W 48/16* | (2009.01) |
| *H04W 48/08* | (2009.01) |
| *H04W 48/14* | (2009.01) |
| *H04L 12/28* | (2006.01) |
| *H04L 12/56* | (2006.01) |
| *H04L 29/06* | (2006.01) |
| *H04W 4/06* | (2009.01) |

(52) U.S. Cl.
CPC .............. *H04W 48/16* (2013.01); *H04W 4/06* (2013.01)

(58) Field of Classification Search
CPC ...... H04W 48/16; H04W 48/08; H04W 8/005; H04W 48/10; H04W 4/02; H04W 4/24; H04W 48/14; H04W 4/206; H04W 48/20; H04L 67/16; H04L 63/0428; H04L 63/104; H04L 65/4076

USPC .................. 709/223-224, 229, 206; 370/252
See application file for complete search history.

(56) References Cited

U.S. PATENT DOCUMENTS 5,462,498 A * 10/1995 Lindblad ...................... 475/342
5,978,366 A * 11/1999 Massingill ........... H04B 1/1615
370/311

(Continued)

FOREIGN PATENT DOCUMENTS

| EP | 2129073 A1 | 12/2009 |
|---|---|---|
| EP | 2293517 A1 | 3/2011 |

(Continued)

OTHER PUBLICATIONS

Jung et al. (Provisional U.S. Appl. No. 61/479,835), filed Apr. 27, 2011.*

(Continued)

*Primary Examiner* — Wutchung Chu
(74) *Attorney, Agent, or Firm* — Kevin T. Cheatham

(57) ABSTRACT

A wireless communication method embeds service related information, including a version of a service associated with the service related information, within an initial wireless access message. The method may also include broadcasting the initial wireless access message including the embedded service related information. Another aspect of the present disclosure includes a wireless communication method that indentifies service related information embedded within an initial wireless access message. The method may also establish a connection with an access node of the wireless communication network to receive a service when a version of a service associated with the service related information satisfies a predetermined condition.

26 Claims, 7 Drawing Sheets

(56) References Cited

U.S. PATENT DOCUMENTS

| | | | | |
|---|---|---|---|---|
| 6,055,413 | A * | 4/2000 | Morse | H04L 12/1895 340/7.43 |
| 6,934,752 | B1 * | 8/2005 | Gubbi | 709/225 |
| 6,961,560 | B2 | 11/2005 | Hermann et al. | |
| 6,993,326 | B2 * | 1/2006 | Link et al. | 455/414.1 |
| 7,613,426 | B2 | 11/2009 | Kuehnel et al. | |
| 7,778,593 | B2 * | 8/2010 | Hsu et al. | 455/3.04 |
| 7,876,735 | B2 * | 1/2011 | Krantz | H04L 12/5692 370/328 |
| 7,974,574 | B2 | 7/2011 | Shen et al. | |
| 8,116,287 | B2 * | 2/2012 | Krantz | H04W 48/08 370/252 |
| 8,166,287 | B2 * | 4/2012 | Bear | G06F 1/16 379/142.15 |
| 8,340,711 | B1 * | 12/2012 | Glass et al. | 455/552.1 |
| 8,363,626 | B2 * | 1/2013 | Faccin | 370/338 |
| 8,682,262 | B2 * | 3/2014 | Austin | H04N 7/163 455/556.1 |
| 8,903,953 | B2 * | 12/2014 | Bockus, Jr. | H04L 67/26 709/219 |
| 2002/0106985 | A1 * | 8/2002 | Sato | H04W 72/005 455/3.01 |
| 2003/0194995 | A1 * | 10/2003 | Handerson | H04W 4/02 455/422.1 |
| 2003/0200455 | A1 * | 10/2003 | Wu | H04L 63/1408 726/23 |
| 2005/0185626 | A1 * | 8/2005 | Meier | H04L 12/4641 370/338 |
| 2005/0202823 | A1 * | 9/2005 | Shaheen et al. | 455/436 |
| 2005/0232209 | A1 * | 10/2005 | Buckley | H04W 4/06 370/338 |
| 2005/0261970 | A1 * | 11/2005 | Vucina et al. | 705/16 |
| 2005/0286456 | A1 * | 12/2005 | McNew et al. | 370/312 |
| 2005/0286466 | A1 * | 12/2005 | Tagg | H04L 12/2856 370/329 |
| 2006/0221901 | A1 * | 10/2006 | Yaqub et al. | 370/331 |
| 2006/0223527 | A1 * | 10/2006 | Lee et al. | 455/432.2 |
| 2007/0073868 | A1 * | 3/2007 | Nelson et al. | 709/224 |
| 2007/0117516 | A1 * | 5/2007 | Saidi | H04L 47/10 455/67.11 |
| 2008/0013487 | A1 * | 1/2008 | Molteni | H04L 41/048 370/329 |
| 2008/0016556 | A1 * | 1/2008 | Selignan | 726/7 |
| 2009/0239469 | A1 | 9/2009 | Rangarajan et al. | |
| 2010/0046553 | A1 * | 2/2010 | Daigle et al. | 370/474 |
| 2010/0074261 | A1 * | 3/2010 | Muhamed | 370/395.3 |
| 2011/0047230 | A1 * | 2/2011 | McGee | 709/206 |
| 2011/0090896 | A1 * | 4/2011 | Bradley | 370/350 |
| 2011/0111054 | A1 * | 5/2011 | Hruska et al. | 424/617 |
| 2011/0151840 | A1 | 6/2011 | Gong et al. | |
| 2011/0264730 | A1 * | 10/2011 | Dattagupta | H04L 12/2809 709/203 |
| 2011/0314145 | A1 * | 12/2011 | Raleigh et al. | 709/224 |
| 2012/0022948 | A1 | 1/2012 | Jones et al. | |
| 2012/0026941 | A1 * | 2/2012 | Ahmad et al. | 370/328 |
| 2013/0103292 | A1 * | 4/2013 | Yuse | G08G 1/096716 701/117 |
| 2013/0191518 | A1 * | 7/2013 | Narayanan | H04L 67/16 709/220 |
| 2013/0210379 | A1 * | 8/2013 | Cloutier | 455/405 |
| 2014/0056168 | A1 * | 2/2014 | Jung et al. | 370/252 |
| 2014/0341038 | A1 * | 11/2014 | Lim | 370/235 |

FOREIGN PATENT DOCUMENTS

| | | |
|---|---|---|
| WO | WO-2010063497 A1 | 6/2010 |
| WO | WO-2012054210 A1 | 4/2012 |

OTHER PUBLICATIONS

Mahaffy et al. (WO2012/054210 A1)Pre-association discovery filed Sep. 30, 2011.*

International Search Report and Written Opinion—PCT/US2013/049239—ISA/EPO—Oct. 1, 2013.

* cited by examiner

DETECTING SERVICES PROVIDED BY A WIRELESS NODE BEFORE DEVICE DISCOVERY AND CONNECTION ESTABLISHMENT

BACKGROUND

Field

Aspects of the present disclosure relate generally to wireless communication systems, and more particularly to service discovery from wireless nodes before device discovery and connection establishment between wireless nodes.

Background

Wireless networks are widely deployed to provide various communication services such as voice, video, packet data, messaging, broadcast and other like wireless communication services. These wireless networks may be multiple-access networks capable of supporting multiple users by sharing the available network resources. In a wireless local area network (WLAN) an access point supports communication for a number of wireless stations within the wireless network. In an ad-hoc mode, the wireless stations communicate in a peer-to peer (P2P) manner without an access point. Similarly, a peer-to-peer network allows the peer nodes to directly communicate with one another. In a peer-to-peer network, peer-to-peer nodes within range of one another discover and communicate directly without an access point.

In implementations of wireless networks, nodes of the wireless networks discover each other and establish a connection before performing service discovery, which is referred to as the "connection prerequisite for service discovery." Service discovery may include information regarding any service related applications or data available from a wireless peer node. This connection prerequisite for service discovery introduces latency. In addition, the connection prerequisite for discovery of service related information consumes additional power.

SUMMARY

According to one aspect of the present disclosure, a wireless communication method includes embedding service related information, including a version of a service associated with the service related information, within an initial wireless access message. The method may also include broadcasting the initial wireless access message including the embedded service related information.

According to another aspect of the present disclosure, an apparatus for wireless communication includes means for embedding service related information, including a version of a service associated with the service related information, within an initial wireless access message. The apparatus may also include means for broadcasting the initial wireless access message including the embedded service related information.

According to one aspect of the present disclosure, an apparatus for wireless communication includes a memory and one or more processors coupled to the memory. The processor(s) is configured to embed service related information, including a version of a service associated with the service related information, within an initial wireless access message. The processor(s) is further configured to broadcast the initial wireless access message including the embedded service related information.

According to another aspect of the present disclosure, a computer program product for wireless communication includes a computer-readable medium having non-transitory program code recorded thereon. The program code includes program code to embed service related information, including a version of a service associated with the service related information, within an initial wireless access message. The program code further includes program code to broadcast the initial wireless access message including the embedded service related information.

According to one aspect of the present disclosure, a wireless communication method includes identifying service related information embedded within an initial wireless access message. The method may also include establishing a connection with an access node of the wireless communication network to receive a service when a version of a service associated with the service related information satisfies a predetermined condition.

According to another aspect of the present disclosure, an apparatus for wireless communication includes means for identifying service related information embedded within an initial wireless access message. The apparatus may also include means for establishing a connection with an access node of the wireless communication network to receive a service when a version of a service associated with the service related information satisfies a predetermined condition.

According to one aspect of the present disclosure, an apparatus for wireless communication includes a memory and one or more processors coupled to the memory. The processor(s) is configured to identify service related information embedded within an initial wireless access message. The processor(s) is further configured to establish a connection with an access node of the wireless communication network to receive a service when a version of a service associated with the service related information satisfies a predetermined condition.

According to another aspect of the present disclosure, a computer program product for wireless communication includes a computer-readable medium having non-transitory program code recorded thereon. The program code includes program code to identify service related information embedded within an initial wireless access message. The program code further includes program code to establish a connection with an access node of the wireless communication network to receive a service when a version of a service associated with the service related information satisfies a predetermined condition.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
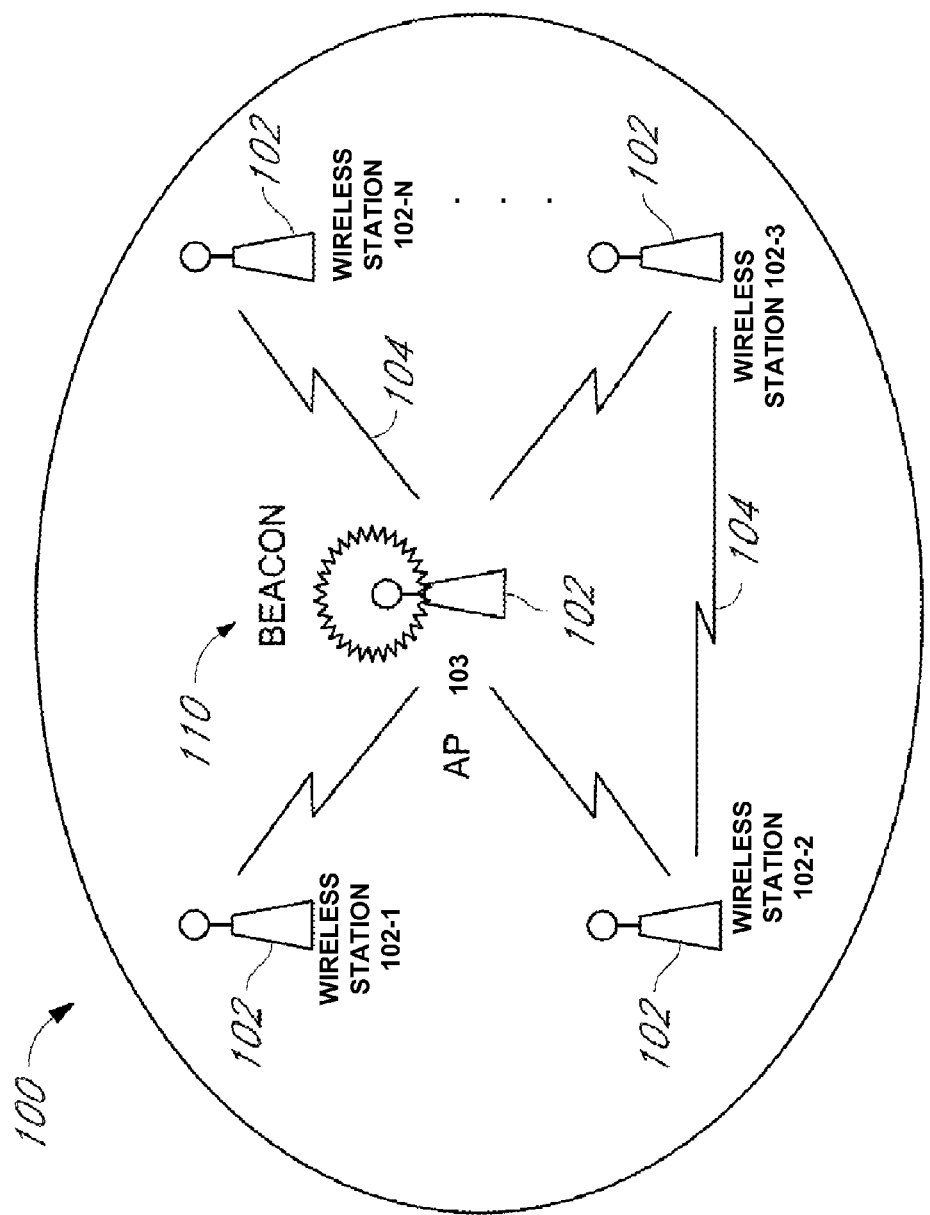
FIG. 1 illustrates a block diagram of a communication system according to one aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art however, that these concepts may be practiced without these specific details. In some instances, well-known structures and components are shown in block diagram form to avoid obscuring such concepts.

In one aspect of the disclosure, a service discovery method detects services or applications provided by wireless nodes (e.g., wireless access points, wireless stations, and wireless peer nodes) without establishing a connection with a wireless node. Although, the wireless nodes may be specified as access points and stations, aspects of the disclosure also relate to ad-hoc and/or peer-to-peer network implementations in which wireless peer nodes and/or wireless stations discover and communicate directly without access points. A wireless station can be a dedicated access point or a temporary access point (e.g., a soft access point) configured for access point functionality, for example, when operating according to a wireless local area network (WLAN) infrastructure mode. In a WLAN ad-hoc mode, or peer to peer network, the wireless stations/peer nodes discover and communicate directly without an access point.

In some aspects of the disclosure, service related information available from a wireless node is embedded within an initial wireless access message. In one configuration, the initial wireless message is a radio communication beacon, a WiFi direct service set identifier (SSID), a basic service set identifier (BSSID) or other like service set identifier. Embedding the service related information within an initial wireless access message eliminates the connection prerequisite for service discovery from a wireless node. The embedded service related information may include a version number and/or a time stamp of the services associated with the service related information.

Detecting available services according to this implementation enables a user of a wireless node (e.g., a wireless station, a peer node, or access point) to locate a device that provides a desired service. An initial wireless access message including the embedded service related information is broadcast by a wireless node. In a WLAN configuration, the service related information is communicated within a radio communication beacon, SSID or BSSID, according to one aspect of the disclosure. In this aspect of the disclosure, the service related information is provided within a new information element of the beacon, SSID or BSSID. The size of the information element may be based on the service or application being provided. The service discovery method may be implemented in various wireless networks such as the WLAN configuration shown in FIG. 1.

One example of a wireless communication system 100 is illustrated in FIG. 1 according to an infrastructure mode. The wireless communication system 100 may include a number of wireless stations 102 and access points 103 that can communicate with one another over wireless links 104. Although the system 100 is illustrated with five wireless stations/access points 102/103, it should be appreciated that any number of stations and access points, wired or wireless, may form the wireless communication system 100. In the illustration, the access point 103 is a dedicated access point or is configured for access point functionality (e.g., as a soft access point).

The wireless stations/access points 102/103 may be any device configured to send and receive wireless communications, such as a laptop computer, Smartphone, a printer, a personal digital assistant, a camera, a cordless telephone, a session initiation protocol phone, a handheld device having wireless connection capability, a user equipment, an access terminal, or any other suitable device. In the system 100, the wireless stations/access points 102/103 may be distributed throughout a geographic region. Further, each wireless station/access point 102/103 may have a different coverage region over which it may communicate. The access point 103 may include or be implemented as a base station, a base transceiver station, a terminal, a wireless node operating as an access point or the like. The wireless stations/access points 102/103 in the wireless communication system 100 may communicate wirelessly using any suitable wireless network standard.

A wireless station 102 may associate with the access point 103 to send and/or receive communications from the access point 103. In one aspect of the disclosure, service related information for services or applications provided by the access point 103 is included in an initial wireless access message 110 broadcast by the access point 103. To receive the initial wireless access message 110, the wireless station 102 may perform a broad coverage search over a coverage region. In some aspects of the disclosure, the access point 103 may use backhaul services, for example, to communicate with a larger network, such as the Internet or a public switched telephone network (PSTN).

In operation, one or more access points 103 may transmit an initial wireless access message 110, such as a radio communication beacon with service related information. Similarly, stations 102 may broadcast an SSID/BSSID with service related information Such initial wireless access messages 110 may be transmitted periodically. In one aspect of the disclosure, the service related information includes a time stamp and/or a version number of the available services provided by the stations/access points 102/103. The service related information may include applications, software and/or data available from the stations/access points 102/103. In some aspects of the disclosure, the initial wireless access message 110 may include service related information both common (e.g., shared) amongst several devices, and information specific to a given device.

In conjunction with the version information, the service related information can include a quality of service level (QoS) level available from the access point 103. For example, the QoS level available from the access point 103 may indicate a percentage of a maximum bandwidth level at which the wireless node operates. A wireless station 102 may receive QoS levels from multiple access points 103 and establish a connection with an access point that provides an acceptable QoS level. The determination, by a wireless station 102, to connect with an access point 103 can be based on the associated version information in addition to or instead of the QoS level.

Figure 2:
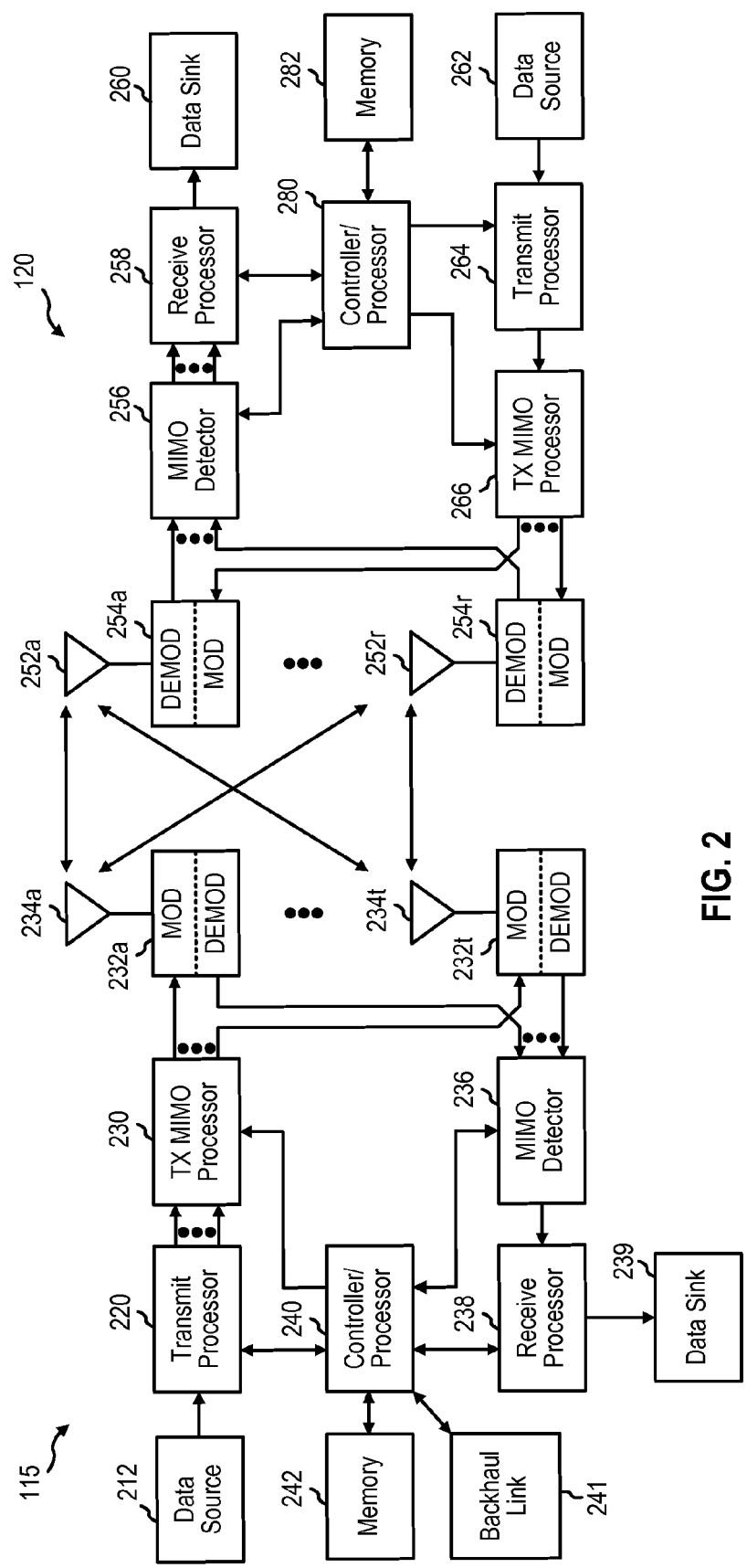
FIG. 2 illustrates exemplary wireless nodes for use in the communication system illustrated in FIG. 1.

FIG. 2 shows a block diagram of a design of an access point 115 and a wireless station 120, each of which may be one of the wireless nodes in FIG. 1. Each of the wireless nodes in the system 100 may include, among others, a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel.

In one configuration, the access point 115 may be equipped with antennas 234a through 234t, and the wireless station 120 may be equipped with antennas 252a through 252r.

At the access point 115, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream to obtain an output sample stream. Each modulator 232 may further process (e.g., convert to analog, amplify, filter, and upconvert) the output sample stream to obtain a transmission signal. Signals from modulators 232a through 232t may be transmitted via the antennas 234a through 234t, respectively.

At the wireless station 120, the antennas 252a through 252r may receive the signals from the access point 115 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the wireless station 120 to a data sink 260, and provide decoded control information to a controller/processor 280.

When transmitting, from the wireless station 120, a transmit processor 264 may receive and process data from a data source 262 and control information from the controller/processor 280. The processor 264 may also generate reference symbols for a reference signal. The symbols from the transmit processor 264 may be precoded by a TX MIMO processor 266 if applicable, further processed by the modulators 254a through 254r, and transmitted to the access point 115. At the access point 115, the signals received from the wireless station 120 may be received by the antennas 234, processed by the demodulators 232, detected by a MIMO detector 236 if applicable, and further processed by a receive processor 238 to obtain decoded data and control information sent by the wireless station 120. The processor 238 may provide the decoded data to a data sink 239 and the decoded control information to the controller/processor 240. The access point 115 can send messages to other base stations, for example, over a backhaul link 241.

The controllers/processors 240 and 280 may direct the operation at the access point 115 and the wireless station 120, respectively. The processor 240/280 and/or other processors and modules at the access point 115/wireless station 120 may perform or direct the execution of the functional blocks illustrated in method flow chart of FIGS. 3 and 4, and/or other processes for the techniques described herein. The memories 242 and 282 may store data and program codes for the access point 115 and the wireless station 120, respectively.

Figure 3:
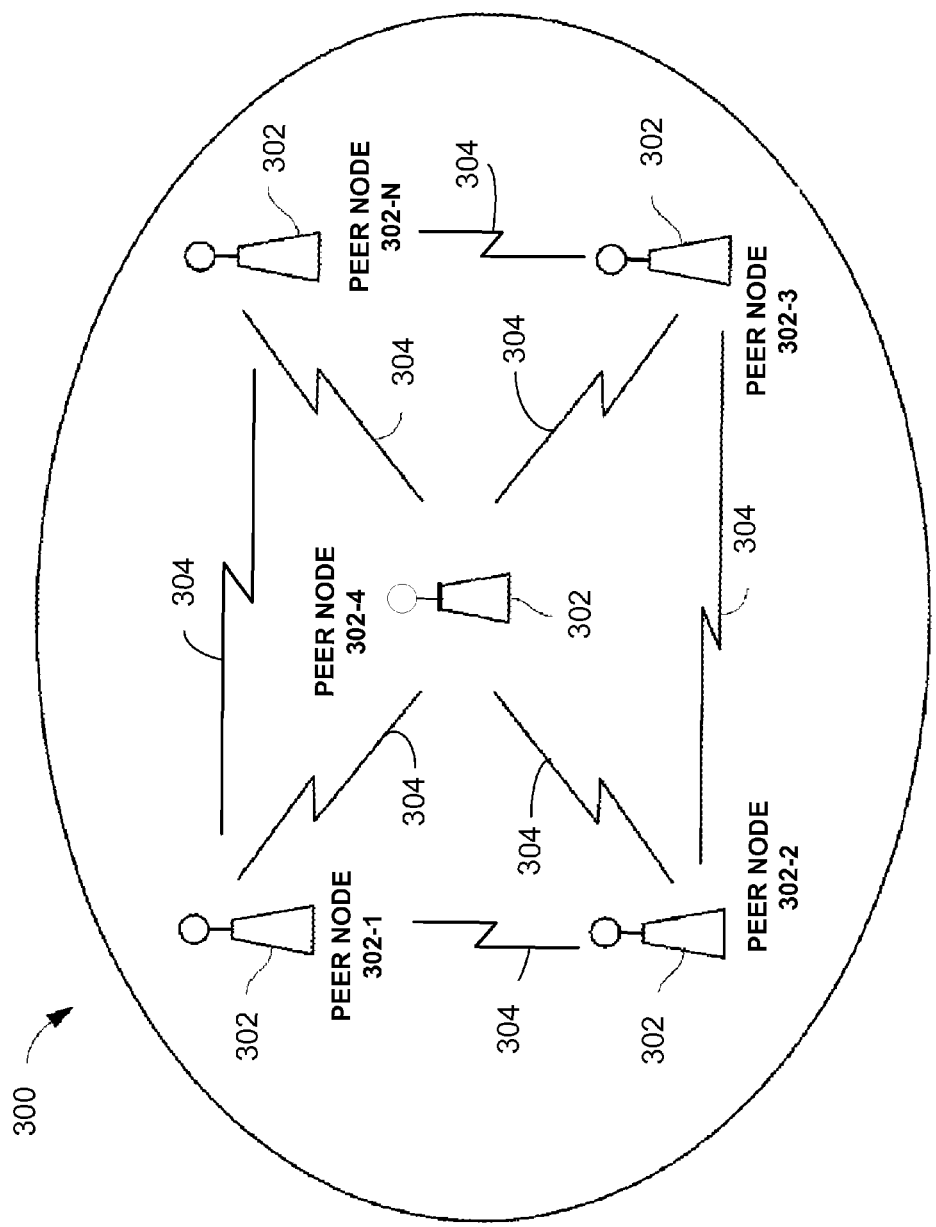
FIG. 3 illustrates a block diagram of a peer-to-peer network according to one aspect of the disclosure.

FIG. 3 illustrates a block diagram of a peer-to-peer network 300 according to one aspect of the disclosure. In some aspects, a peer-to-peer network 300 may be established between two or more peer nodes 302-1, 302-2, 302-3, 302-4, . . . 302-n. The peer nodes 302-1, 302-2, 302-3, 302-4, . . . 302-n in the peer-to-peer network 300 may communicate wirelessly using any suitable wireless network standard. The peer-to-peer network 300 may include a number of peer nodes 302 that can communicate with one another over wireless links 304.

A peer node 302-1 may associate with another peer node 302-4 to send and/or receive communications from the peer node 302-4. In one aspect of the disclosure, service related information for services or applications provided by the peer node 302-4 is included in an initial wireless access message broadcast by the peer node 302-4. To receive the initial wireless access message, the peer node 302-1 may perform a broad coverage search over a coverage region.

The service related information may include any service related applications, and/or data available from the peer nodes 302. For example, the peer node 302-4 might provide a news service. In this configuration, the service related information may include a version of the information from the news service. Such version information distinguishes, for example, morning news from evening news. Based on the version information, a wireless node (e.g., peer node, wireless station, access point) can gain access to the most recent version of available applications, services, and/or data without having to connect to each node to determine what version is available at each node.

In one example, a user of a peer node 302-2 may request a particular service (e.g., color printing). By analyzing received service information, the user can identify peer nodes 302 or devices associated with the peer nodes 302 that provide printing services. This occurs without connecting to each peer node 302. Based on the determination, a user of the peer node 302-2 can then establish a wireless connection only with the peer node 302 that provides color printing. As a result, the wireless node (e.g., peer node, wireless station, access point), which wakes up to perform service discovery can save battery power by reducing wake up time and reduce latency by establishing a connection only when service related information in the initial wireless access message indicates color printer services. In one configuration, the version information includes a version number, which indicates whether the printer is a color printer.

In one aspect of the disclosure, the version information includes timing information. The timing information may be a time stamp of when a service or a new update of a service is received. In this configuration, the service related information includes a timestamp of the available service, application, or data from the wireless node. For example, the wireless node might provide a new service or news related data. In this example, the service related information includes a timestamp to distinguish the morning news from the evening news. The version information and the timestamp information may also enable sharing of software between the nodes of a wireless network.

Service discovery prior to device discovery and connection establishment, according to one aspect of the disclosure, enables wireless services (e.g., time and version sensitive information such as news) for rural areas where radio service is limited. The elimination of a connection for discovery of service related information provides improved power savings. For example, a wireless node may wake and perform service discovery according to received initial wireless access message before any connection is established with the wireless node. A wireless node may be any device configured to send and receive wireless communications, such as a laptop computer, Smartphone, a printer, a personal digital assistant, a camera, a cordless telephone, a session initiation protocol phone, a handheld device having wireless connection capability, a user equipment, an access terminal, or any other suitable device.

Figure 4:
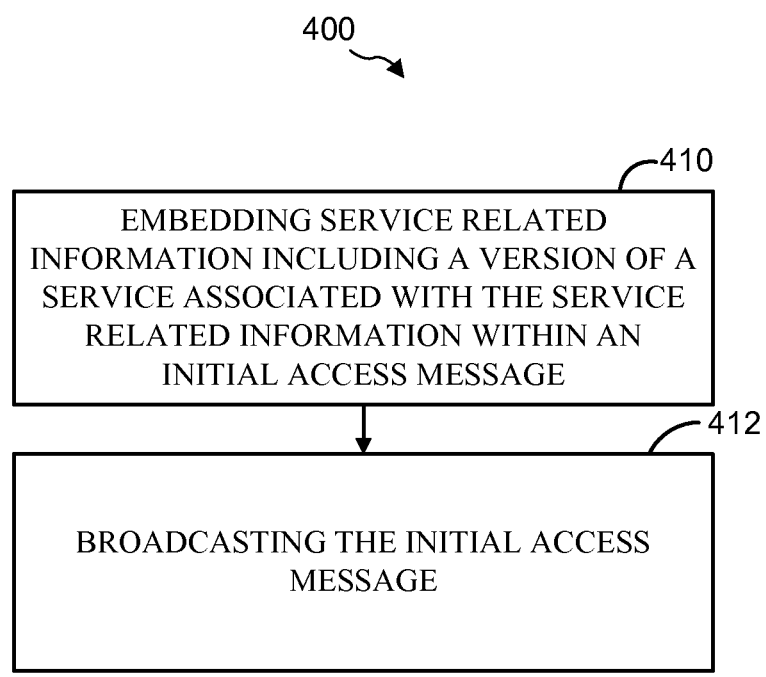
FIG. 4 is a block diagram illustrating a service discovery method implemented in the communication system illustrated in FIG. 1.

FIG. 4 is a block diagram illustrating a service discovery method 400 implemented in the communication system illustrated in FIG. 1. At block 410, the method includes embedding service related information, including a version of a service associated with the service related information, within an initial wireless access message. At block 412, the method includes broadcasting the initial wireless access message including the embedded service related information.

Figure 5:
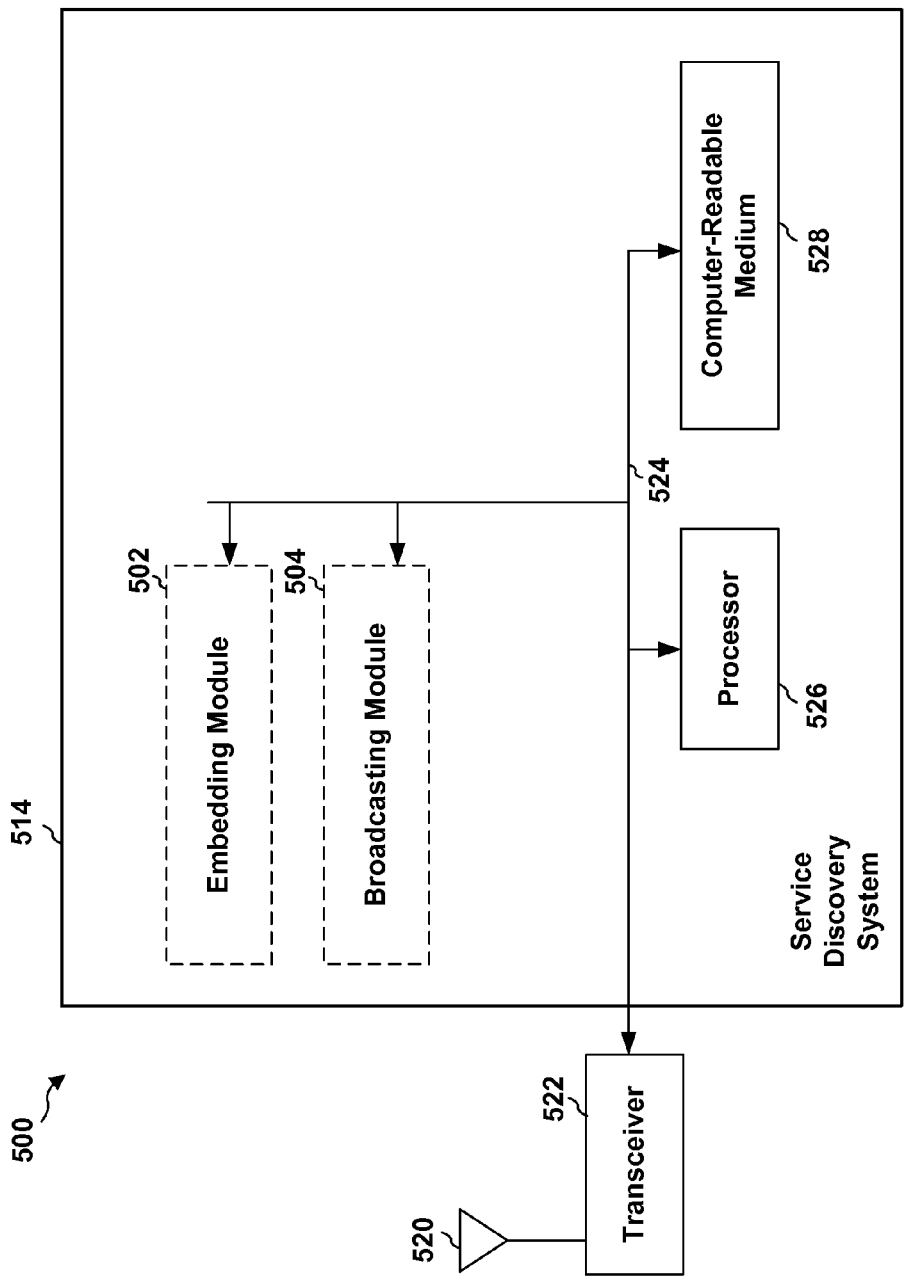
FIG. 5 is a diagram illustrating an example of a hardware implementation for an apparatus employing a service discovery system.

FIG. 5 is a diagram illustrating an example of a hardware implementation for an apparatus 500 employing a service discovery system 514. The service discovery system 514 may be implemented with a bus architecture, represented generally by a bus 524. The bus 524 may include any number of interconnecting buses and bridges depending on the specific application of the service discovery system 514 and the overall design constraints. The bus 524 links together various circuits including one or more processors and/or hardware modules, represented by a processor 526, an embedding module 502, a broadcasting module 504 and a computer-readable medium 528. The bus 524 may also link various other circuits such as timing sources, peripherals, voltage regulators, and power management circuits, which are well known in the art, and therefore, will not be described any further.

The apparatus includes the service discovery system 514 coupled to a transceiver 522. The transceiver 522 is coupled to one or more antennas 520. The transceiver 522 provides a way for communicating with various other apparatus over a transmission medium. The service discovery system 514 includes the processor 526 coupled to the computer-readable medium 528. The processor 526 is responsible for general processing, including the execution of software stored on the computer-readable medium 528. The software, when executed by the processor 526, causes the service discovery system 514 to perform the various functions described supra for any particular apparatus. The computer-readable medium 528 may also be used for storing data that is manipulated by the processor 526 when executing software.

The service discovery system 514 further includes the embedding module 502 for embedding service related information, including a version of a service associated with the service related information, within an initial wireless access message. The service discovery system 514 further includes the broadcasting module 504 for broadcasting the initial wireless access message including the embedded service related information. The embedding module 502 and the broadcasting module 504 may be software modules running in the processor 526, resident/stored in the computer readable medium 528, one or more hardware modules coupled to the processor 526, or some combination thereof. The service discovery system 514 may be a component of the wireless station 120, a component of the peer node 302 and/or a component of the access point 115 and may include the memory 242, 282 and/or the controller/processor 240, 280.

In one configuration, the apparatus 500 for wireless communication includes means for embedding service related information and means for broadcasting the initial wireless access message. The means may be the embedding module 502, broadcasting module 504, the wireless station 120, the access point 115, the memory 242, 282, the controller/processor 240, 280, and/or the service discovery system 514 of the apparatus 500 configured to perform the functions recited by the embedding means and the broadcasting means. In another aspect, the aforementioned means may be any module or any apparatus configured to perform the functions recited by the aforementioned means.

Figure 6:
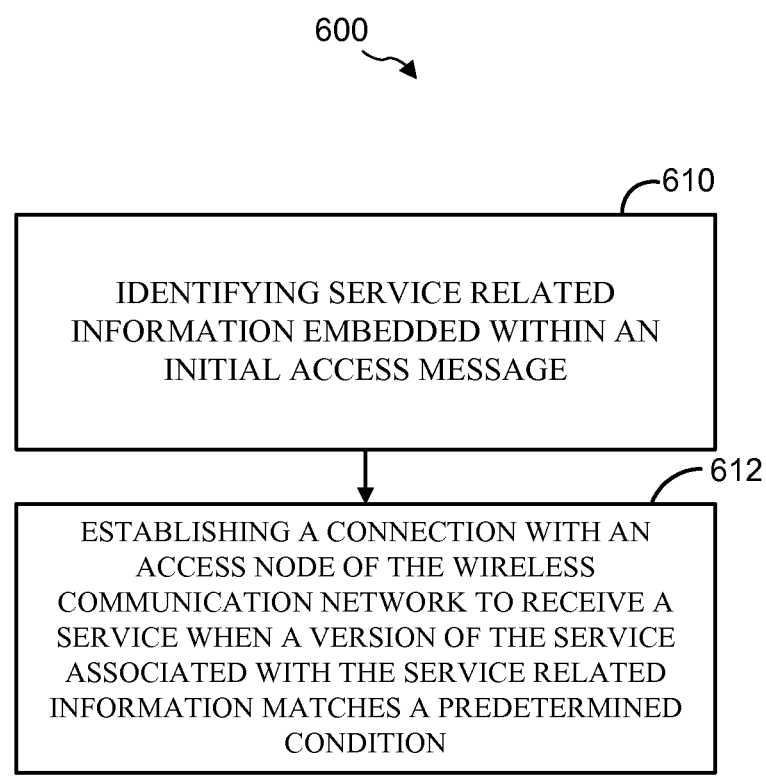
FIG. 6 is a block diagram illustrating a service discovery method implemented in the communication system illustrated in FIG. 1.

FIG. 6 is a block diagrams illustrating a service discovery method 600 implemented in the communication system illustrated in FIG. 1. At block 610, the method identifies service related information embedded within an initial wireless access message. At block 612, the method establishes a connection with an access node of the wireless communication network to receive a service when a version of a service associated with the service related information satisfies a predetermined condition.

Figure 7:
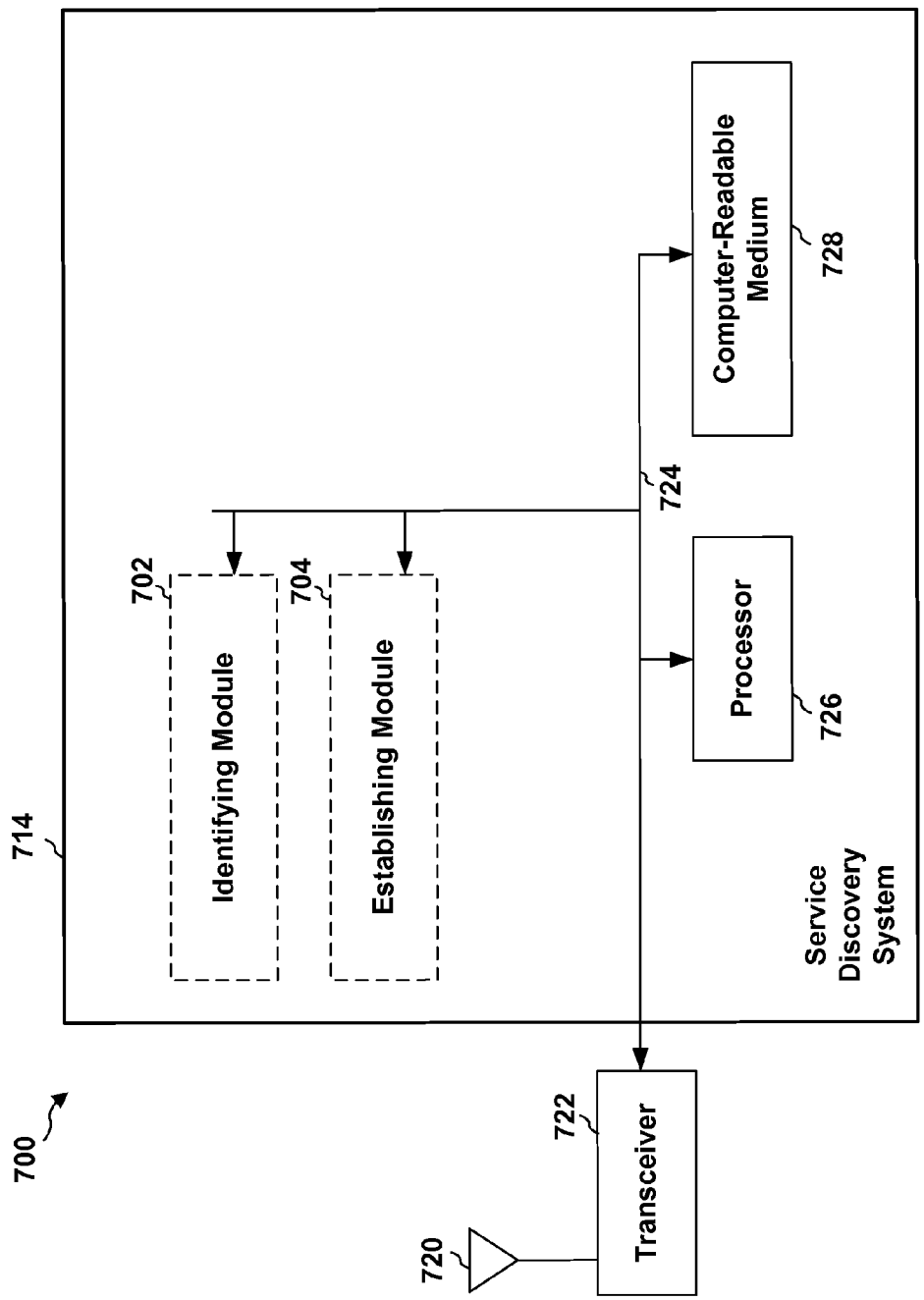
FIG. 7 is a diagram illustrating an example of a hardware implementation for an apparatus employing a service discovery system.

FIG. 7 is a diagram illustrating an example of a hardware implementation for an apparatus 700 employing a service discovery system 714. The service discovery system 714 may be implemented with a bus architecture, represented generally by a bus 724. The bus 724 may include any number of interconnecting buses and bridges depending on the specific application of the service discovery system 714 and the overall design constraints. The bus 724 links together various circuits including one or more processors and/or hardware modules, represented by a processor 726, an identifying module 702, an establishing module 704 and a computer-readable medium 728. The bus 724 may also link various other circuits such as timing sources, peripherals, voltage regulators, and power management circuits, which are well known in the art, and therefore, will not be described any further.

The apparatus includes the service discovery system 714 coupled to a transceiver 722. The transceiver 722 is coupled to one or more antennas 720. The transceiver 722 provides a way for communicating with various other apparatus over a transmission medium. The service discovery system 714 includes the processor 726 coupled to the computer-readable medium 728. The processor 726 is responsible for general processing, including the execution of software stored on the computer-readable medium 728. The software, when executed by the processor 726, causes the service discovery system 714 to perform the various functions described supra for any particular apparatus. The computer-readable medium 728 may also be used for storing data that is manipulated by the processor 726 when executing software.

The service discovery system 714 further includes the identifying module 702 for identifying service related information embedded within an initial wireless access message. The service discovery system 714 further includes the establishing module 704 for establishing a connection with an access node of the wireless communication network to receive a service when a version of a service associated with the service related information satisfies a predetermined condition. The identifying module 702, and the establishing module 704 may be software modules running in the processor 726, resident/stored in the computer readable medium 728, one or more hardware modules coupled to the processor 726, or some combination thereof. The service discovery system 714 may be a component of the wireless station 120, a component of the peer node 302 and/or a component of the access point 115 and may include the memory 242, 282 and/or the controller/processor 240, 280.

In one configuration, the apparatus 700 for wireless communication includes means for identifying service related information and means for establishing a connection with an access node. The means may be the identifying module 702, establishing module 704, the wireless station 120, the access point 115, the peer node 302, the memory 242, 282, the controller/processor 240, 280, and/or the service discovery system 714 of the apparatus 700 configured to perform the functions recited by the identifying means and establishing means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   embedding service related information available from an access node, including an indication of an available information service and a version including a timestamp of information provided by the information service, within an initial wireless access message;
   broadcasting the version including the timestamp in the initial wireless access message including the embedded service related information, by the access node, to a plurality of wireless stations to provide the plurality of wireless stations with the version and corresponding timestamp of the information without establishing a connection with the access node; and establishing a connection with a wireless station of the plurality of wireless stations to provide the information service to the wireless station only when the wireless station of the plurality of wireless stations determines, prior to the connection being established and prior to discovery of the access node, availability of the information service is indicated by the embedded service related information.

2. The method of claim 1, in which embedding the service related information further comprises:
inserting the service related information within a radio communication beacon.

3. The method of claim 1, in which embedding the service related information further comprises:
inserting the service related information within a service set identifier (SSID).

4. The method of claim 1, in which the service related information comprises a quality of service level available from the access node.

5. The method of claim 1, in which the service related information indicates applications available from the access node.

6. The method of claim 1, in which the version comprises a version number of the service.

7. A method of wireless communication, comprising:
identifying, at a wireless station, service related information embedded within an initial wireless access message, the service related information including an indication of an available information service and a version including a timestamp of information provided by the information service, the version including the timestamp of the service related information broadcasted from an access node from which the service is available to the wireless station to provide the wireless station with the version and corresponding timestamp without establishing a connection with the access node; and
establishing, by the wireless station, a connection with the access node of a wireless communication network only when the wireless station of the plurality of wireless stations determines, prior to the connection being established and prior to discovery of the access node, availability of the information service is indicated by the embedded service related information to receive the service.

8. The method of claim 7, in which the initial wireless access message comprises a radio communication beacon.

9. The method of claim 7, in which the initial wireless access message comprises a service set identifier (SSID).

10. The method of claim 7, in which the service related information comprises a quality of service level available from the access node.

11. The method of claim 7, in which the service related information indicates applications available from the access node.

12. The method of claim 7, in which the version comprises a version number of a service associated with the service related information.

13. An apparatus for wireless communication, comprising:
means for embedding service related information available from an access node, including an indication of an available information service and a version including a timestamp of information provided by the information service, within an initial wireless access message;
means for broadcasting the version including the timestamp in the initial wireless access message including the embedded service related information, by the access node, to a plurality of wireless stations to provide the plurality of wireless stations with the version and corresponding timestamp of the information without establishing a connection with the access node; and
means for establishing a connection with a wireless station of the plurality of wireless stations to provide the information service to the wireless station only when the wireless station of the plurality of wireless stations determines, prior to the connection being established and prior to discovery of the access node, availability of the information service is indicated by the embedded service related information.

14. An apparatus for wireless communication, comprising:
means for identifying, at a wireless station, service related information embedded within an initial wireless access message, the service related information including an indication of an available information service and a version including a timestamp of information provided by the information service, the version including the timestamp of the service related information broadcasted from an access node from which the service is available to the wireless station to provide the wireless station with the version and corresponding timestamp without establishing a connection with the access node; and
means for establishing, by the wireless station, a connection with the access node of a wireless communication network only when the wireless station of the plurality of wireless stations determines, prior to the connection being established and prior to discovery of the access node, availability of the information service is indicated by the embedded service related information to receive the service.

15. An apparatus for wireless communication, comprising:
a memory; and
at least one processor coupled to the memory and configured:
to embed service related information available from an access node, including an indication of an available information service and a version including a timestamp of information provided by the information service, within an initial wireless access message;
to broadcast the version including the timestamp in the initial wireless access message including the embedded service related information, by the access node, to a plurality of wireless stations to provide the plurality of wireless stations with the version and corresponding timestamp of the information without establishing a connection with the access node; and
to establish a connection with a wireless station of the plurality of wireless stations to provide the information service to the wireless station only when the wireless station of the plurality of wireless stations determines, prior to the connection being established, availability of the information service is indicated by the embedded service related information.

16. The apparatus of claim 15, in which the at least one processor is further configured to embed the service related information by inserting the service related information within a radio communication beacon.

17. The apparatus of claim 15, in which the at least one processor is further configured to embed the service related information by inserting the service related information within a service set identifier (SSID).

18. The apparatus of claim 15, in which the version comprises a version number of the service.

19. The apparatus of claim 15, in which the service related information comprises a quality of service level available from the access node.

20. An apparatus for wireless communication, comprising:
    a memory; and
    at least one processor coupled to the memory and configured:
        to identify, at a wireless station, service related information embedded within an initial wireless access message, the service related information including an indication of an available information service and a version including a timestamp of information provided by the information service, the version including the timestamp of the service related information broadcasted from an access node from which the service is available to the wireless station to provide the wireless station with the version and timestamp without establishing a connection with the access node; and
        to establish, by the wireless station, a connection with the access node of a wireless communication network only when the wireless station of the plurality of wireless stations determines, prior to the connection being established, availability of the information service is indicated by the embedded service related information to receive the service.

21. The apparatus of claim 20, in which the initial wireless access message comprises a radio communication beacon.

22. The apparatus of claim 20, in which the initial wireless access message comprises a service set identifier (SSID).

23. The apparatus of claim 20, in which the service related information comprises quality of service level available from the access node.

24. The apparatus of claim 20, in which the version comprises a version number of the service.

25. A non-transitory computer-readable medium having non-transitory program code recorded thereon which, when executed by a processor, causes the processor:
    to embed service related information available from an access node, including an indication of an available information service and a version including a timestamp of information provided by the information service, within an initial wireless access message;
    to broadcast the version including the timestamp in the initial wireless access message including the embedded service related information, by the access node, to a plurality of wireless stations to provide the plurality of wireless stations with the version and corresponding timestamp of the information without establishing a connection with the access node; and
    to establish a connection with a wireless station of the plurality of wireless stations to provide the information service to the wireless station only when the wireless station of the plurality of wireless stations determines, prior to the connection being established, availability of the information service is indicated by the embedded service related information.

26. A non-transitory computer-readable medium having non-transitory program code recorded thereon which, when executed by a processor, causes the processor:
    to identify, at a wireless station, service related information embedded within an initial wireless access message, the service related information including an indication of an available information service and a version including a timestamp of information provided by the information service, the version including the timestamp of the service related information broadcasted from an access node from which the service is available to the wireless station to provide the wireless station with the version and corresponding timestamp without establishing a connection with the access node; and
    to establish, by the wireless station, a connection with the access node of a wireless communication network only when the wireless station of the plurality of wireless stations determines, prior to the connection being established, availability of the information service is indicated by the embedded service related information to receive the service.

* * * * *